United States Patent [19]
Bratt et al.

[11] Patent Number: 5,572,704
[45] Date of Patent: Nov. 5, 1996

[54] SYSTEM AND METHOD FOR CONTROLLING SPLIT-LEVEL CACHES IN A MULTI-PROCESSOR SYSTEM INCLUDING DATA LOSS AND DEADLOCK PREVENTION SCHEMES

[75] Inventors: Joseph P. Bratt, San Jose; John Brennan, Mountainview; Peter Y. Hsu, Freemont; William A. Huffman, Los Gatos; Joseph T. Scanlon, Sunnyvale, all of Calif.; Steve Ciavagia, Williston, Vt.

[73] Assignee: Silicon Graphics, Inc., Mountain View, Calif.

[21] Appl. No.: 167,005

[22] Filed: Dec. 15, 1993

[51] Int. Cl.$^6$ ..................... G06F 12/16
[52] U.S. Cl. ............ 395/488; 395/448; 395/449; 395/479; 364/DIG. 1; 364/229.2; 364/243.45; 364/246.8
[58] Field of Search .................... 395/444, 447, 395/448, 449, 450, 452, 453, 454, 455, 456, 457, 458, 459, 467, 496, 488, 479

[56] References Cited

U.S. PATENT DOCUMENTS 5,287,484  2/1994  Nishii et al. ............... 395/449

*Primary Examiner*—Eddie P. Chan
*Assistant Examiner*—Hiep T. Nguyen
*Attorney, Agent, or Firm*—Sterne, Kessler, Goldstein & Fox P.L.L.C.

[57] ABSTRACT

A method for preventing data loss and deadlock in a multi-processor computer system wherein at least one processor in the computer system includes a split-level cache. The split-level cache has a byte-writable first-level and a word-writable second level. The method monitors the second level cache to determine if a forced atomic (FA) instruction is in a second level cache pipeline. If an FA instruction is determined to be in the second level cache pipeline, then interventions to the second level cache are delayed until the FA instruction exits the second level cache pipeline. In this manner data written by operation of cache memory access instruction that cause the interventions is not destroyed by the execution of the FA instruction, thereby preventing data loss. The method also monitors the second level cache pipeline to determine if a possible miss (PM) instruction is in the second level cache pipeline. If a PM instruction is determined to be in the second level cache pipeline, the FA instructions are prevented from entering the second level cache pipeline such that execution of interventions to the second level cache is not prevented when an instruction in the second level cache may be detained to process an intervention in its behalf, thereby preventing deadlock between processing units of the computer system.

14 Claims, 5 Drawing Sheets

SYSTEM AND METHOD FOR CONTROLLING SPLIT-LEVEL CACHES IN A MULTI-PROCESSOR SYSTEM INCLUDING DATA LOSS AND DEADLOCK PREVENTION SCHEMES

CROSS-REFERENCE TO OTHER APPLICATIONS

U.S. patent application entitled "Split Level Cache", U.S. patent application Ser. No. 08/168,832, filed Dec. 15, 1993 now U.S. Pat. No. 5,510,934, incorporated herein by reference.

U.S. patent application entitled "Superscalar Microprocessor Instruction Pipeline Including Instruction Dispatching and Kill Control", U.S. patent application Ser. No. 08/168,094, filed Dec. 15, 1993.

U.S. patent application entitled "Conflict Resolution In Interleaved Memory System With Multiple Parallel Accesses", U.S. patent application Ser. No. 08/168,827, filed Dec. 15, 1993, now abandoned.

U.S. patent application entitled "Apparatus for Processing Instructions in a Computing System", U.S. patent application Ser. No. 08/168,744, filed Dec. 15, 1993.

U.S. patent application entitled "Variable Page Size Translation Lookaside Buffer", U.S. patent application Ser. No. 08/168,822, filed Dec. 15, 1993 now U.S. Pat. No. 5,526,504.

U.S. patent application entitled "Mechanism and Method for Integer Divide Involving Pre-Alignment of the Divisor Relative to the Dividend", U.S. patent application Ser. No. 08/167,006, filed Dec. 15, 1993, which has since issued as U.S. Pat. No. 5,493,523.

U.S. patent application entitled "Load Latency of Zero and Cache Coherency of Store Operations Resulting from Out-of-Order Floating Point Execution in a RISC Processor", U.S. patent application Ser. No. 08/167,004, filed Dec. 15, 1993.

U.S. patent application entitled "Debug Mode for a Superscalar RISC Processor", U.S. patent application Ser. No. 08/166,969, filed Dec. 15, 1993 now U.S. Pat. No. 5,537,538.

BACKGROUND OF THE INVENTION

1. Field of the Invention

The present invention relates to data cache coherency in a computer system comprising a split-level cache arrangement.

2. Related Art

A modern computer system includes a memory hierarchy that comprises various memory devices of varying sizes and speeds. Such memory devices include, for example, a small but fast cache memory, and a larger but slower primary memory.

Data can be found in either the cache memory or the primary memory. Also, a plurality of devices (such as a central processing unit and input/output devices) access and update the data contained in the cache memory and the primary memory. Thus, at any time, data may be inconsistent or stale in the cache memory and/or in the primary memory.

This is called the cache coherency problem. The cache coherency problem is magnified in multi-processor computer systems where a plurality of processors each includes one or more caches, and coherency is required among all of the caches.

Systems and methods for maintaining cache coherency are well known and are described in many publicly available documents, such as John L. Hennessy and David A. Patterson, *Computer Architecture—A Quantitative Approach* (Morgan Kaufmann Publishers, Inc., San Mateo, Calif., U.S.A., 1990), which is herein incorporated by reference in its entirety. These conventional systems and methods are sufficient for solving the cache coherency problems that exist in most computer systems.

New computer architectures, however, may spawn new types of cache coherency problems. These cache coherency problems may be difficult to detect, much less analyze and solve. Conventional cache coherency techniques may not be adequate to solve these new cache coherency problems.

Thus, what is required is a system and method for solving cache coherency related problems that exist in a computer system having a split-level cache arrangement.

SUMMARY OF THE INVENTION

The present invention is directed to a control system and method for controlling the execution of cache memory access instructions in a computer system comprising a plurality of processing units each having at least one cache. Multi-processor cache coherency is maintained in the computer system. At least one of the processing units of the computer system includes a split-level cache arrangement that comprises a first level cache coupled to a second level cache, wherein integer store instructions enable data to be stored in both the first level cache and the second level cache. The first level cache is byte writable and the second level cache is word writable.

The control system of the present invention monitors a pipeline of the second level cache to determine whether a forced atomic (FA) instruction is in the second level cache pipeline. A FA instruction is an integer store instruction which requires allocation in the first level cache and which enables data of length other than a word multiple to be stored in the first level cache. During execution of a FA instruction, one or more bytes are read from the first level cache and written to the second level cache along with write data of the FA instruction, such that data of word length is written to the second level cache.

If it is determined that a FA instruction is in the second level cache pipeline, then the control system delays interventions to the second level cache until the FA instruction exits the second level cache pipeline. This results in delaying the execution of the cache memory access instructions responsible for generation of said interventions, such that data written by operation of said cache memory access instructions is not destroyed by operation of the FA instruction.

The control system also monitors the second level cache to determine whether a possible miss (PM) instruction is in the second level cache pipeline. A PM instruction is a cache memory access instruction which requires allocation in the second level cache but which does not require allocation in the first level cache.

If it is determined that a PM instruction is in the second level cache pipeline, then the control system prevents FA instructions from entering the second level cache pipeline. In this manner, execution of interventions to the second level cache is not prevented while there is a potential for an instruction in the second level cache to be detained while an intervention is processed in its behalf, such that deadlock between processing units of the computer system is prevented.

The control system also determines whether an aligned multi-byte word in which the write data of an integer store operation is contained is exclusive in the first level cache. If it is determined that the aligned word is not exclusive in the first level cache, then the control system prevents the integer store operation from entering a pipeline of the second level cache, and initiates a cache miss and fill operation to cause the aligned word to be exclusive in the first level cache.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

1.0 Hardware Environment

Figure 1:
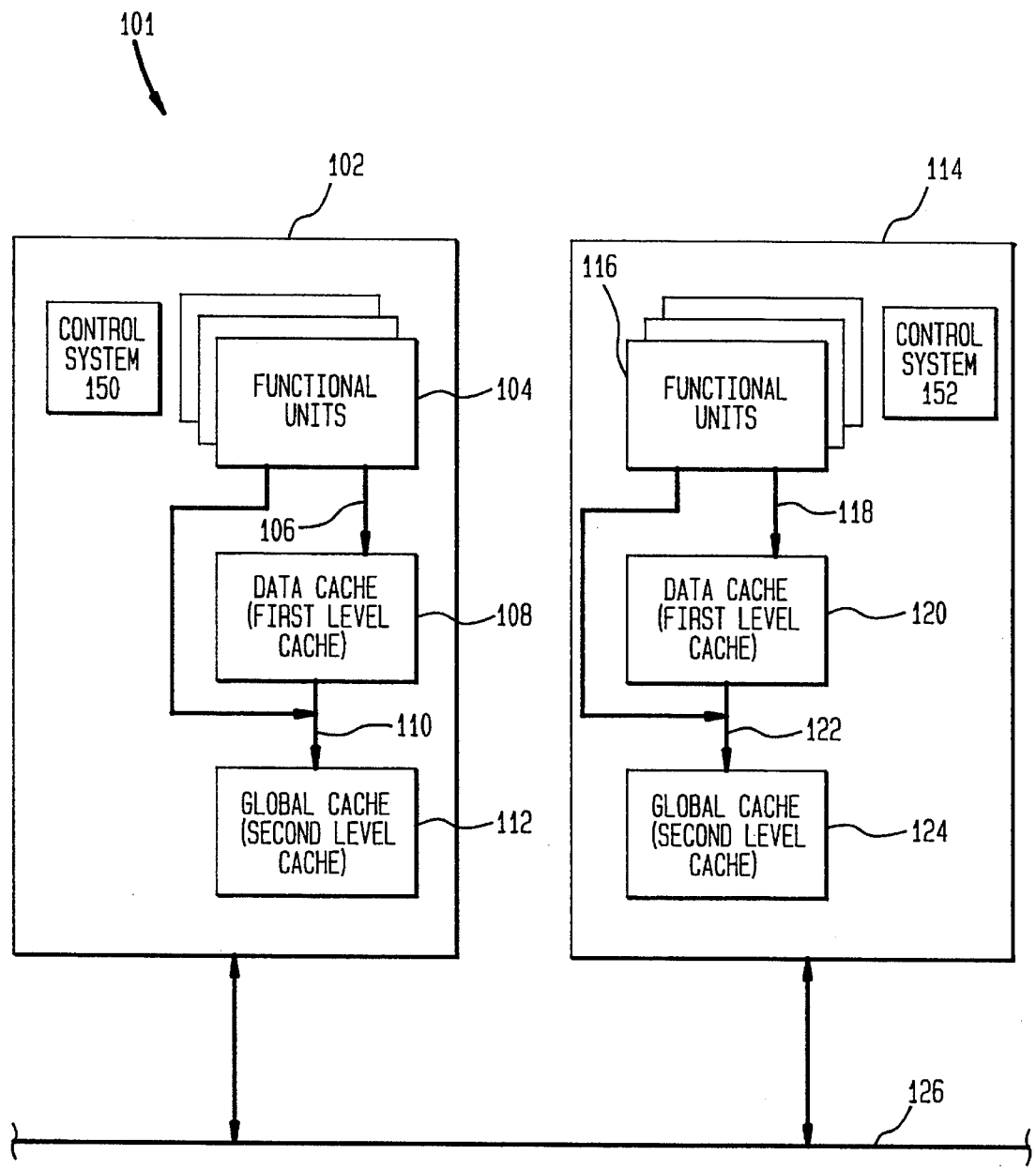
FIG. 1 is a block diagram of a computer system in which the present invention operates.

A partial block diagram of a computer system 101 in which the present invention preferably operates is shown in FIG. 1. As will be appreciated by persons skilled in the relevant art, the computer system 101 includes other components not shown in FIG. 1.

The computer system 101 includes a processing unit 102 that is connected to a bus 126. The processing unit 102 is preferably a RISC (reduced instruction set computer) processor, although it could alternatively be a processor having another type of computer architecture. RISC computer processors are discussed in the following documents: G. Kane and J. Heinrich, *MIPS RISC Architecture* (Prentice Hall, Englewood Cliffs, N.J., U.S.A., 1992); Mike Johnson, *Superscalar Microprocessor Design* (Prentice Hall, Englewood Cliffs, N.J., U.S.A., 1991); and Stephen B. Furber, *VLSI RISC Architecture and Organization* (Marcel Dekker, Inc., New York, N.Y., U.S.A., 1989), all of which are incorporated herein by reference.

The processing unit 102 includes a plurality of functional units (FU) 104, such as an integer functional unit (IU; not explicitly shown in FIG. 1) for performing integer operations, and a floating point functional unit (FPU; not explicitly shown in FIG. 1) for performing floating point operations.

The processing unit 102 includes a split-level cache arrangement that comprises a first level cache, such as a data cache 108, and a second level cache, such as a global cache 112. Generally, the data cache 108 is smaller than the global cache 112 (the data cache 108 has a preferred size of 16 Kbytes, whereas the global cache 112 has a preferred size of up to 16 Mbytes). The data cache 108 contains a subset of the data stored in the global cache 112. The data cache 108 is generally faster in operation than the global cache 112.

The data cache 108 is preferably formed on the same computer chip as the IU (accordingly, the data cache 108 is sometimes called the "on-chip cache") in the processing unit 102. The global cache 112 is preferably external to the functional units 104 in the processing unit 102 (accordingly, the global cache 112 is sometimes called the "off-chip cache").

Integer data resides in the data cache 108. Floating point data resides in the global cache 112. The global cache 112 is also a second-level storage unit for integer data. An integer store operation causes integer data to be stored in both the data cache 108 and the global cache 112. A floating point store operation bypasses the data cache 108 and causes floating point data to be stored in the global cache 112.

Preferably, the data cache 108 supports non-word writes. Preferably, the data cache 108 supports byte writes (although the data cache 108 may support writes of different non-word write lengths). That is, data may be written to the data cache 108 in one-byte packets (in other words, the data cache 108 is preferably byte writable). The global cache 112 does not support byte writes. Instead, the global cache 112 supports word writes, wherein a word is preferably four bytes (in other words, the global cache 112 is word writable).

By supporting word writes, rather than byte writes, it is possible to implement the global cache 112 using fewer RAMs (random access memories), thereby reducing the cost of the processing unit 102. This is the case, since the granularity of parity is greater when supporting byte writes than when supporting word rights. For example, where a word is 32 bits and where the global cache 112 is implemented using RAMs having a write width of 4 bits, one parity RAM is required for every two data RAMs when byte writes are supported. In contrast, one parity RAM is required for every eight data RAMs when word writes are supported.

As noted above, integer store operations cause integer data to be stored in both the data cache 108 and the global cache 112. As also noted above, the data cache 108 supports byte writes, whereas the global cache 112 supports word writes.

Figure 2:
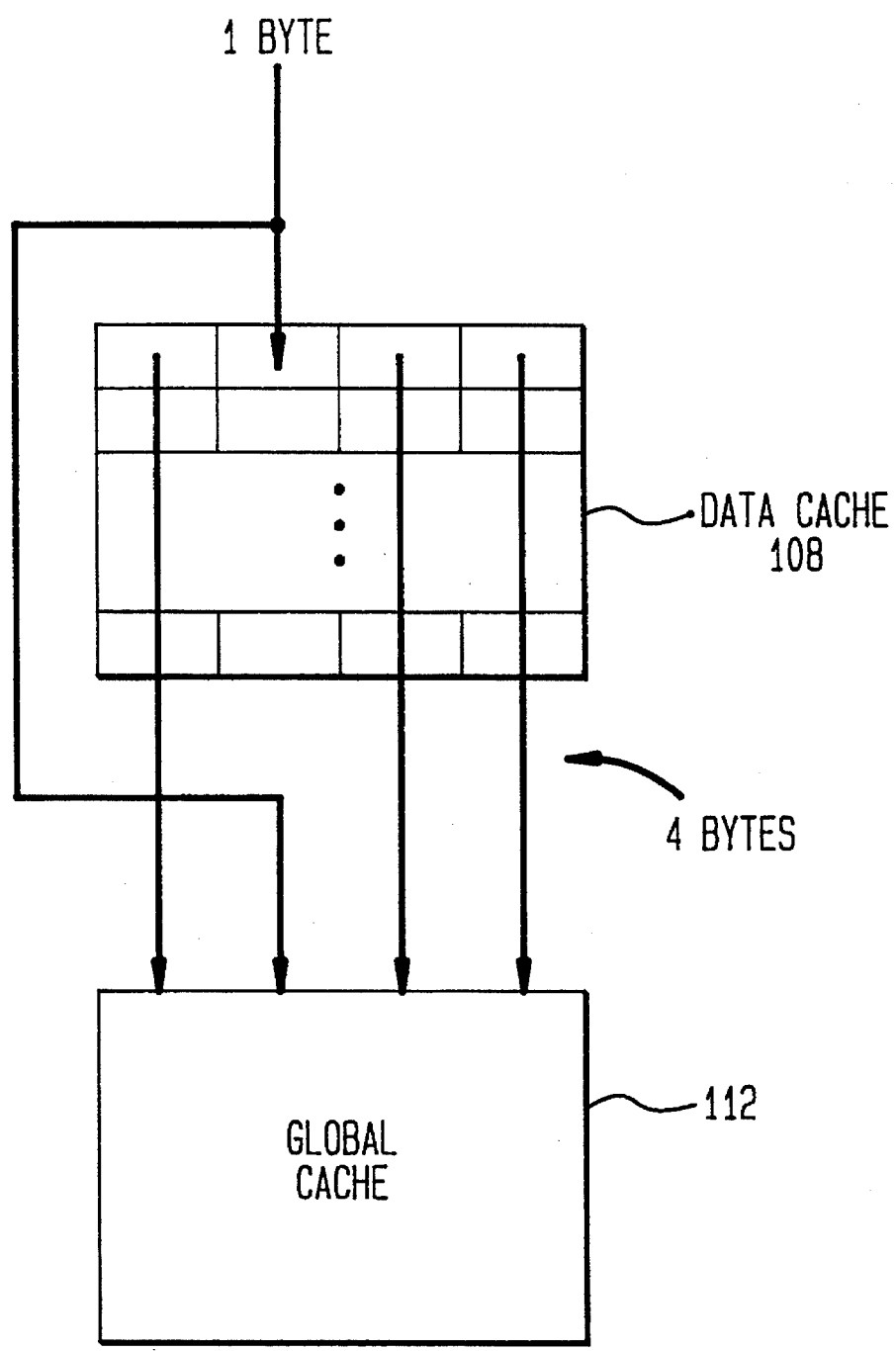
FIG. 2 illustrates the manner in which an integer store operation is implemented in a computer system having a split-level cache arrangement.

FIG. 2 illustrates the manner in which a 1-byte integer store operation is implemented with respect to the global cache 112. The data cache 108 is conceptually depicted in FIG. 2 as comprising a plurality of rows wherein each row includes an aligned four byte data word.

During the operation of a 1-byte integer store operation, one byte (this represents the "write data" of the integer store operation) is written to one of the rows of the data cache 108. Also, the other three bytes of this row are read from the data cache 108, and then these three bytes are appropriately combined with the byte (that is, the write data) of the integer store operation to form a data word. This word is then stored in the global cache 112.

Data stores to the data cache 108 and the global cache 112 are pipelined. The data store pipelines associated with the data cache 108 and the global cache 112 (the data cache pipeline is indicated by 106 in FIG. 1, and the global cache pipeline is indicated by 110 in FIG. 1) are such that integer stores to the data cache 108 are committed before floating point misses to the global cache 112 are realized. Thus, it is not possible to "back-out" of integer store instructions after commitment of the store to the data cache 108, but before completion (including realization of a floating point miss) of the floating point store to the global cache 112.

The split-level cache arrangement is further discussed in an U.S. patent application entitled "Split Level Cache", Ser. No. 08/168,832, referenced above.

Referring again to FIG. 1, the computer system 101 includes additional processing units that are connected to the bus 126, such as processing unit 114. These additional processing units connected to the bus 126 may having a split-level cache arrangement (such as processing unit 114), or may have other types of cache arrangements (although such cache arrangements must be able to store both integer data and floating point data). For reference purposes, the processing unit 102 is sometimes called the first processing unit 102, and the processing unit 114 is sometimes called the second processing unit 114.

The computer system 101 supports multi-processor data coherence. That is, coherency of the integer and floating point data distributed among and stored in the processing units connected to the bus 126 is maintained by the computer system 101. The computer system 101 includes a cache coherency mechanism (not shown) for maintaining this data coherency.

Systems and methods for cache coherency are well known and are described in many publicly available documents, such as *Computer Architecture A Quantitative Approach*, cited above. Such well-known cache coherency techniques can be used to implement many aspects of the cache coherency mechanism of the computer system 101.

The inventors have identified cache coherency-related problems in the computer system 101 which are due to the specific structural and operational features of the computer system 101, particularly the split-level cache arrangement discussed above. The inventors have also developed solutions to these cache coherency-related problems. These cache coherency-related problems have never before been identified and, consequently, have never before been solved.

The cache coherency-related problems which were identified by the inventors, and the solutions to these problems which were developed by the inventors, are discussed in the following sections.

2.0 Data Loss Problem

As a result of the specific structural and operational features of the computer system 101, there is a chance that data stored in a cache by one processor may be destroyed by the operation of another processor. Specifically, this data loss problem is due to the following features of the computer system 101: (1) the split-level cache arrangement; (2) the difference in write granularity of the data cache 108 and the global cache 112 (that is, that the data cache 108 supports byte writes whereas the global cache 112 supports word writes); (3) the multi-processor coherence requirement of the computer system 101; and (4) the fact that integer stores to the data cache 108 are committed before floating point misses to the global cache 112 are realized.

Figure 3:
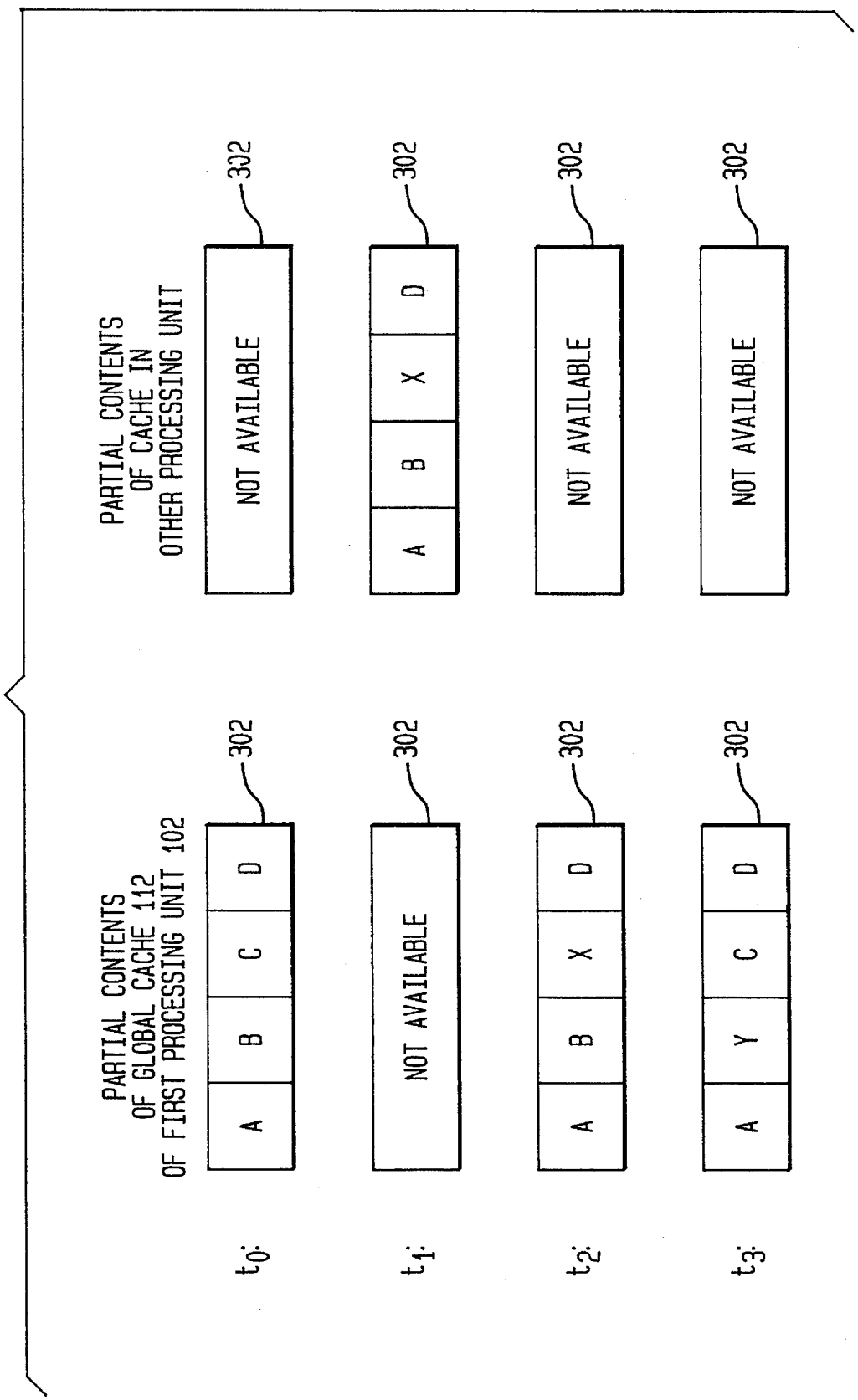
FIG. 3 depicts a scenario where data is lost due to the structural and operational features of a computer system having a split-level cache arrangement.

FIG. 3 depicts a scenario where this data loss problem occurs, wherein selected contents of the global cache 112 in the first processing unit 102 and the cache of another processing unit (not shown in FIG. 1) connected to the bus 126 are shown at four different times t0, t1, t2, and t3 (these times are not necessarily equally spaced from one another). Assume that the cache of this other processing unit supports byte writes.

At time t0, the global cache 112 in the first processing unit 112 stores an aligned four-byte word 302 having byte values A, B, C, and D. Assume that an exclusive copy of this word (that is, the only valid copy in the computer system 101) is contained in the global cache 112 of the first processing unit 102. Consequently, this word 302 is not available in the cache of the other processing unit, as indicated in FIG. 3.

Sometime between times t0 and t1, one of the functional units 104 in the first processing unit 102 issues an integer store instruction to write a byte "Y" to the data word 302 stored in the data cache 108 and the global cache 112 of the first processing unit 102. The processing of this integer store instruction causes bytes A, C, and D to read from the data cache 108 of the first processor 102 and to be appropriately combined with the byte "Y" associated with the integer store instruction.

Also between times t0 and t1, a functional unit in the other processing unit issues a store instruction to write a byte "X" to the data word 302. However, the data word 302 is not valid and exclusive in the cache of the other processing unit, so a cache miss message is issued by the other processing unit (in the computer system 101, it is possible to write to data in a cache only if the data is exclusive).

As a result of the cache miss message, the exclusive copy of the data word 302 is transferred from the first processing unit 102 to the other processing unit. Then, the store instruction completes in the other processing unit such that a byte "X" is stored in one of the bytes of the data word 302. These actions are completed by time t1, as shown in FIG. 3.

Sometime between times t1 and t2, the combined bytes A, Y, C, and D are ready to be written into the data cache 108 of the first processor 102. However, data word 302 is not valid and exclusive in the data cache 108 of the first processing unit 102, so a cache miss message is issued by the first processing unit 102. As a result of the cache miss message, the exclusive copy of the data word 302 is transferred from the other processing unit to the first processing unit 102. These actions are completed by time t2, as shown in FIG. 3.

Sometime between times t2 and t3, the pending integer store instruction is completed in the first processing unit 102, such that bytes A, Y, C, and D are stored in the data word 302. Note that byte "X" that was written in the data word 302 by the other processing unit has been destroyed by operation of the first processing unit 102. Thus, as a result of the specific structural and operational features of the computer system 101, data stored in a cache by one processor has been destroyed by the operation of another processor.

The data loss problem was identified and understood by the inventors only after a detailed and comprehensive analysis of the computer system 101. The data loss problem was difficult to identify, much less understand and solve, given the multiplicity and complexity of the factors (listed above) which combined to create the problem.

3.0 Solution of the Data Loss Problem According to the Present Invention

The solution developed by the inventors to solve the data loss problem will now be discussed.

The data loss problem is solved by ensuring that cache memory access instructions which may result in the data loss problem are executed atomically. Specifically, cache memory access instructions which may result in the data loss problem are atomically executed from the initiation of the read (of the three bytes) in the data cache 108 to the completion of the write (of the four bytes) in the global cache 112. In other words, a cache memory access instruction which may result in the data loss problem is atomically executed from the point at which the instruction enters the pipeline of the global cache 112 (indicated by 110 in FIG. 1) to the point at which the instruction exits the pipeline of the global cache 112. Interventions are not permitted during the atomic execution portion of such instructions.

As well known to persons skilled in the relevant art, an intervention is performed on the behalf of a Processor X and involves reading data from the cache of a Processor Y, wherein such data is used to update the cache of the Processor X. Interventions are necessary to maintain coherency among caches in a computer system.

Consider, for example, the scenario presented in FIG. 3. As discussed above, at time t0 the global cache 112 in the first processing unit 112 stores an exclusive copy of an aligned four-byte word 302 having byte values A, B, C, and D. The integer store instruction which is issued between times t0 and t1 by one of the functional units 104 in the first processing unit 102 initiates a memory read of bytes A, C, and D from the data cache 108.

According to the present invention, at this point the integer store instruction has entered an atomic execution portion such that interventions to the global cache 112 are blocked. Consequently, the other processing unit does not have an opportunity to modify the data word 302 until after the pending integer store instruction in the first processing unit 102 completes (that is, until after the bytes A, Y, C, and D are stored in the global cache 112).

After this pending store instruction completes in the first processing unit 102, the exclusive copy of the data word 302 is transferred to the other processing unit (that is, interventions to the global cache 112 are allowed after the pending store instruction completes and exits the pipeline of the global cache 112). Then, byte "X" is written to the data word 302 such that the data word 302 includes bytes A, Y, X, and D.

By operation of the present invention, therefore, data stored in a cache by one processor (that is, the other processor in the example of FIG. 3) is not destroyed by the operation of another processor (that is, the first processing unit 102 in the example of FIG. 3).

As discussed above, the present invention solves the data loss problem by ensuring that cache memory access instructions which may result in the data loss problem are executed atomically. These instructions are called forced atomic (FA) instructions since they are forced to be atomically executed, as discussed above.

As part of the solution of the data loss problem, the inventors have identified FA instructions as including any integer store instructions (that is, any cache memory access instructions which require data to be stored in both the data cache 108 and the global cache 112) which store other than aligned word blocks. In the preferred embodiment, the data store width of the global cache 112 is four bytes, such that FA instructions are integer store instructions which store other than an aligned block of four bytes, or which store other than aligned multiples of four bytes. Such instructions require allocation in the data cache 108, and require that the data cache 108 be accessed to retrieve bytes to fill out four-byte stores to the global cache 112.

This solution to the data loss problem is described in greater detail below.

4.0 Deadlock Problem

As discussed above, the data loss problem is solved by identifying FA instructions and by atomically executing the FA instructions. However, as described below, the atomic execution of FA instructions spawns a new problem which involves the possibility of deadlock of processing units in the computer system 101.

There are two aspects of the deadlock problem, deadlock due to potential miss instructions and deadlock due to the need for data exclusivity when performing forced atomic instructions. These aspects of the deadlock problem are discussed in the following sections.

4.1 Deadlock Due To Potential Miss Instructions

A scenario involving the execution of FA instructions that results in deadlock shall now be described with reference to FIG. 1.

At a time t0, suppose that a floating write instruction is initiated in the first processing unit 102. Similarly, suppose that a floating write instruction is initiated in the second processing unit 114. As discussed above, floating write instructions bypass the data caches 108, 120 and proceed directly to the global caches 112, 124.

At a time t1, suppose that the pending floating write instruction has not completed in the first processing unit 102, and that a FA integer write instruction is initiated in the first processing unit 102. During the processing of the FA integer write instruction in the first processing unit 102, a read operation of the data cache 108 is initiated to retrieve the appropriate three bytes to fill out the forthcoming four-byte write to the global cache 112. Thus, interventions in the global cache 112 with regard to the aligned four-byte word containing these three bytes (and also containing the write data of the FA integer write instruction) are blocked.

Also at time t1, suppose that the pending floating write instruction has not completed in the second processing unit 114, and that a FA integer write instruction is initiated in the second processing unit 114. During the processing of the FA integer write instruction in the second processing unit 114, a read operation of the data cache 120 is initiated to retrieve the appropriate three bytes to fill out the forthcoming four-byte write to the global cache 124. Thus, interventions in the global cache 124 with regard to the aligned four-byte word containing these three bytes (and also containing the write data of the FA integer write instruction) are blocked.

At a time t2, suppose that a cache miss is realized for the pending floating write instruction in the first processing unit 102. That is, the data which is to be modified by the floating write instruction is not valid and exclusive in the global cache 112 of the first processing unit 102. Also suppose that this data is valid and exclusive in the global cache 124 of the second processing unit 114. Thus, to complete the pending floating write instruction in the first processing unit 102, an intervention at the global cache 124 of the second processing unit 114 is required. However, this intervention is blocked due to the atomic execution of the pending FA integer write instruction in the second processing unit 114.

Also at time t2, suppose that a cache miss is realized for the pending floating write instruction in the second processing unit 114. That is, the data which is to be modified by the floating write instruction is not valid and exclusive in the global cache 124 of the second processing unit 114. Also suppose that this data is valid and exclusive in the global cache 112 of the first processing unit 102. Thus, to complete the pending floating write instruction in the second processing unit 114, an intervention at the global cache 112 of the first processing unit 102 is required. However, this intervention is blocked due to the atomic execution of the pending FA integer write instruction in the first processing unit 102.

Thus, the first processing unit 102 is blocked waiting on data from the second processing unit 114, and the second processing unit 114 is blocked waiting on data from the first processing unit 102. However, data from the first processing unit 102 is not available until the first processing unit 102 becomes unblocked. Similarly, data from the second processing unit 114 is not available until the second processing unit 114 becomes unblocked. Accordingly, a deadlock situation exists between the first and second processing units 102, 114.

4.2 Solution to the Deadlock Problem (Potential Miss Instructions) According To The Present Invention The solution developed by the inventors to solve this deadlock problem will now be discussed.

As identified by the inventors, there are two categories of cache memory access instructions which are of interest with regards to this deadlock problem. The first instruction category includes cache memory access instructions which may result in the data loss problem. These instructions are called forced atomic (FA) instructions, and are defined and discussed above.

The second instruction category includes cache memory access instructions which do not require allocation in the data cache 108, 120 (that is, which do not store data in the data cache 108, 120) and which directly access the global cache 112, 124. These are unlike FA instructions, which do require allocation in the data cache 108, 120.

It is not possible for a FA instruction in the pipeline of a global cache 112, 124 to generate a global cache miss (but see the discussion on this topic in the following section). This is the case, since FA instructions require allocation in the data caches 108, 120, and since the data caches 108, 120 store a proper subset of the data stored in the global caches 112, 124, respectively.

In contrast, an instruction of the second instruction category can generate a global cache miss, since these instructions do not require allocation in the data caches 108, 120. Accordingly, instructions of the second instruction category are called potential miss (PM) instructions.

There is actually a third instruction category which includes cache memory access instructions which do not fall into the first instruction category or the second instruction category. Instructions of the third instruction category can be grouped with either first instruction category instructions or with second instruction category instructions. Such groupings may be made, for example, to enhance performance. Instructions of the third instruction category are not relevant to the solution of the deadlock problem, and thus shall not be discussed further.

Once they identified the FA and the PM instruction categories, the inventors were able to completely analyze the deadlock problem and devise a procedure to solve the deadlock problem. Specifically, the inventors determined that the deadlock problem potentially occurred only when a potential miss instruction was followed by a forced atomic instruction. More particularly, and with respect to the processing unit 102 for illustrative purposes, the inventors determined that the deadlock problem potentially occurred only when a FA instruction was allowed to enter the pipeline of the global cache 112 when a PM instruction was already in the pipeline of the global cache 112.

In the scenario discussed above, for example, the floating write instructions initiated at time t0 represent PM instructions. The integer write instructions initiated at time t1 represent FA instructions.

Thus, according to the present invention, the deadlock problem is avoided by allowing a FA instruction to enter the pipeline of the global cache 112 only when there are no PM instructions already in the pipeline of the global cache 112. If there are any PM instructions already in the pipeline of the global cache 112, then the FA instruction is stalled.

This solution to the deadlock problem (that is due, in part, to potential miss instructions) is described in greater detail below.

4.3 Deadlock Due to Need For Data Exclusivity When Performing Forced Atomic Instructions The above section describes a deadlock problem that is due to the performance of potential miss instructions. This section describes a deadlock problem that is due to the need for data exclusivity when performing forced atomic instructions. This deadlock problem is similar to the potential miss deadlock problem.

As discussed above, with reference to the processing unit 102 for illustrative purposes, it is possible to write data to the global cache 112 only if the global cache 112 stores the exclusive copy of the data (that is, only if the global cache 112 stores the only valid copy of the data). If a floating point write is made to the global cache 112 and the exclusive copy of the data of interest is not stored in the global cache 112, then a cache miss and fill operation (that is, an intervention) must be performed.

In the computer system 101, a 1-byte FA integer write operation performed in the first processing unit 102 causes a write to the data cache 108 and to the global cache 112. According to the present invention, with regard to the write to the data cache 108, the data byte of interest (that is, the byte in the data cache 108 that is being modified by the integer write operation) is required to be in a cache block that is exclusive in the data cache 108; otherwise, processing of the integer write operation is not allowed to proceed. Preferably, the width of a cache block is 128 bytes, although the cache block width can be other values without departing from the scope and spirit of the present invention.

The inventors have determined that the integer write operation should be allowed to enter the pipeline to the global cache 112 only if the data byte of interest, as well as the other three bytes of the aligned four-byte word (in which the data byte of interest is contained), are in a cache block that is exclusive in the data cache 108. Otherwise, deadlock may result.

Consider a scenario where the integer write operation is allowed to enter the pipeline of the global cache 112 even when these four bytes are not exclusive in the data cache 108. In this scenario, assume that these four bytes are also not exclusive in the global cache 112. When the integer read operation reaches the end of the pipeline to the global cache 112, a cache miss and fill operation (that is, an intervention) is generated.

In this scenario, therefore, the FA instruction includes the properties of a potential miss instruction, since it generated a miss in the global cache 112. As a result, a potential for deadlock exists since the FA instruction can both block interventions to the global cache 112, and wait on exclusivity from another processing unit.

4.4 Solution To The Deadlock Problem (Data Exclusivity Requirement) According To the Present Invention According to the present invention, this deadlock problem is solved by requiring exclusive allocates on store in the data cache 108. Specifically, a FA integer write operation is committed in the data cache 108 only if the cache block in which the aligned four-byte word of interest is contained is exclusive in the data cache 108. Otherwise, a cache miss and fill operation is generated. Note that the FA integer write instruction is not in the pipeline to the global cache 112 when this cache miss and fill operation is issued, and this cache miss and fill operation is not atomically performed. Thus, there is no danger of deadlock.

This solution to the deadlock problem (that is due to the exclusivity requirement) is described in greater detail below.

5.0 Summary of Solution and Implementation of Solution

As discussed above, the specific structural and operational features of the computer system 101 have caused a number of cache coherency related problems. The inventors have identified these problems and have developed a system and method for eliminating these problems. In essence, the system and method of the present invention control the execution of cache memory access instructions by implementing the following three rules (for illustrative purposes, reference is made to the processing unit 102 to describe these rules):

(1) If a FA instruction (that will operate to modify a data word) is in the pipeline of the global cache 112, then interventions to the global cache 112 with regard to the data word (that is, which reference the data word) are delayed until the FA instruction completes and exits the pipeline of the global cache 112. Alternatively, if a FA instruction is in the pipeline of the global cache 112, then interventions to the entire global cache 112 are delayed until the FA instruction completes and exits the pipeline of the global cache 112.

(2) If a PM instruction is in the pipeline of the global cache 112, then FA instructions are not allowed to enter the pipeline of the global cache 112. Such FA instructions are stalled (that is, they are aborted and re-started at a later time).

(3) If the aligned word associated with a FA instruction is not exclusive in the data cache 108, then the FA instruction is not allowed to enter the pipeline to the global cache 112, and a non-atomic cache miss and fill is generated.

Rule (1) solves the data loss problem. Rule (2) solves the deadlock problem (potential miss). Rule (3) solves the deadlock problem (data exclusivity requirement).

The present invention also includes a fourth rule: If an intervention is pending in the global cache 112, then a FA instruction is not allowed to enter the pipeline of the global cache 112. Instead, the FA instruction is delayed until after all of the pending interventions are complete.

This fourth rule does not operate to solve any of the problems discussed above. Rather, this fourth rule exists for performance reasons. The fourth rule ensures that interventions will not be blocked forever by FA instructions, but will instead be given the opportunity to be processed.

Rules (1), (2), and (4) are preferably implemented by appending a FA bit and a PM bit to each instruction which enters the pipeline of the global cache 112. If an instruction is a forced atomic instruction, then its FA bit is preferably set to one, otherwise it is set to zero. Similarly, if an instruction is a potential miss instruction, then its PM bit is preferably set to one, otherwise it is set to zero.

Figure 4:
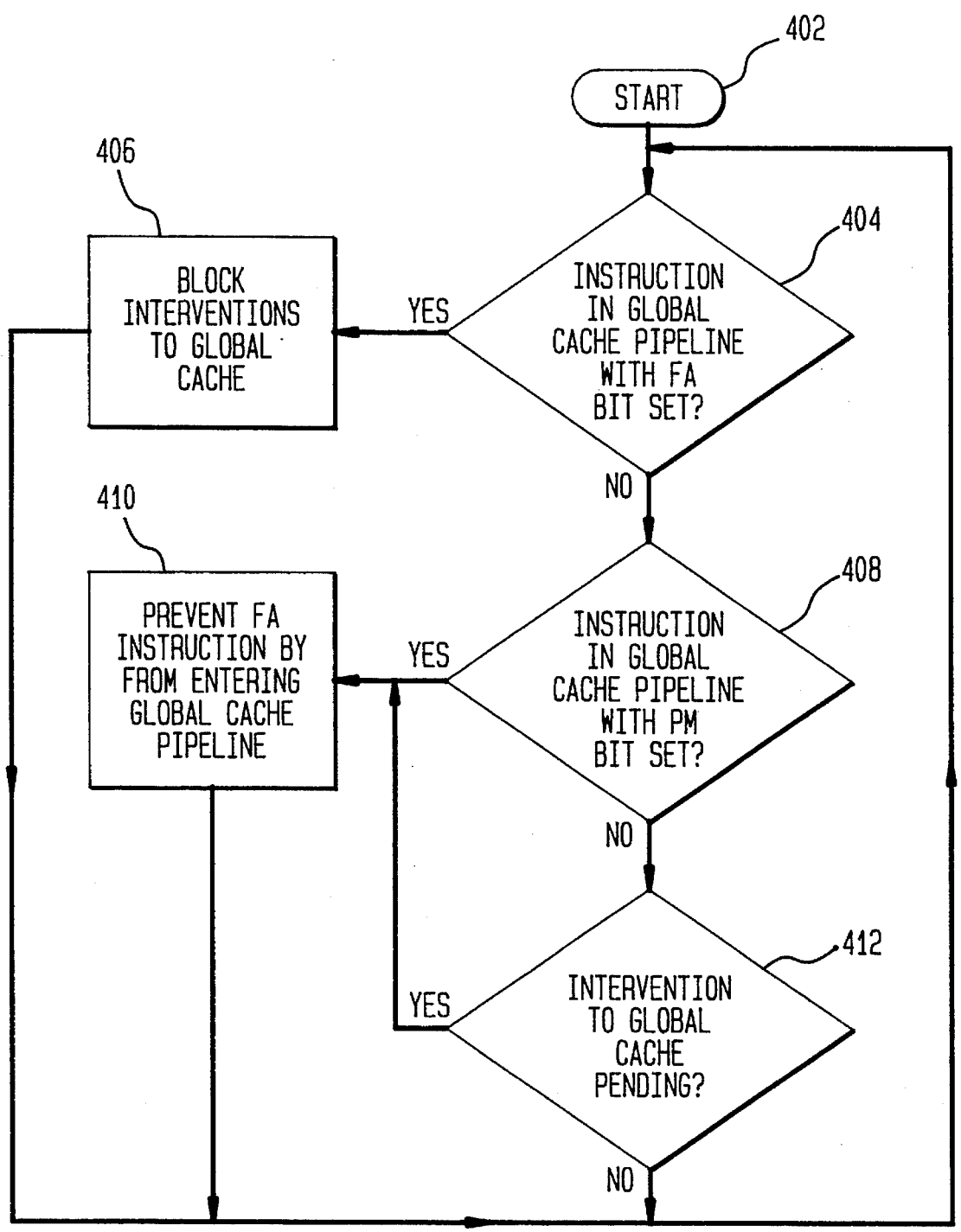
FIGS. 4 and 5 illustrate flowcharts depicting the operation of a control system according to a preferred embodiment of the present invention.

A control system 150 preferably monitors instructions as they enter the pipeline of the global cache 112 (not that control lines between the control system 150 and the elements of the processing unit 102 are not shown for clarity purposes). The operation of the control system 150 shall now be described with reference to the flowchart shown in FIG. 4.

If the control system 150 detects in the global cache pipeline an instruction with its FA bit set to one (represented by step 404), then the control system 150 blocks interventions to appropriate data (that is, the aligned four-bit word of interest) in the global cache 112 (represented by step 406). This implements the first rule.

Similarly, if the control system 150 determines that an intervention is pending to the global cache 112 (represented by step 412), then the control system 150 prevents FA instructions from entering the pipeline of the global cache 112 (represented by step 410). It is assumed that the control system 150 is in contact with other components of the computer system 101 which have knowledge of the pendency of interventions. This implements the fourth rule.

If the control system 150 detects in the global cache pipeline an instruction with its PM bit set to one (represented by step 408), then the control system 150 prevents FA instructions from entering the global cache pipeline (represented by step 410). This implements the second rule.

Figure 5:
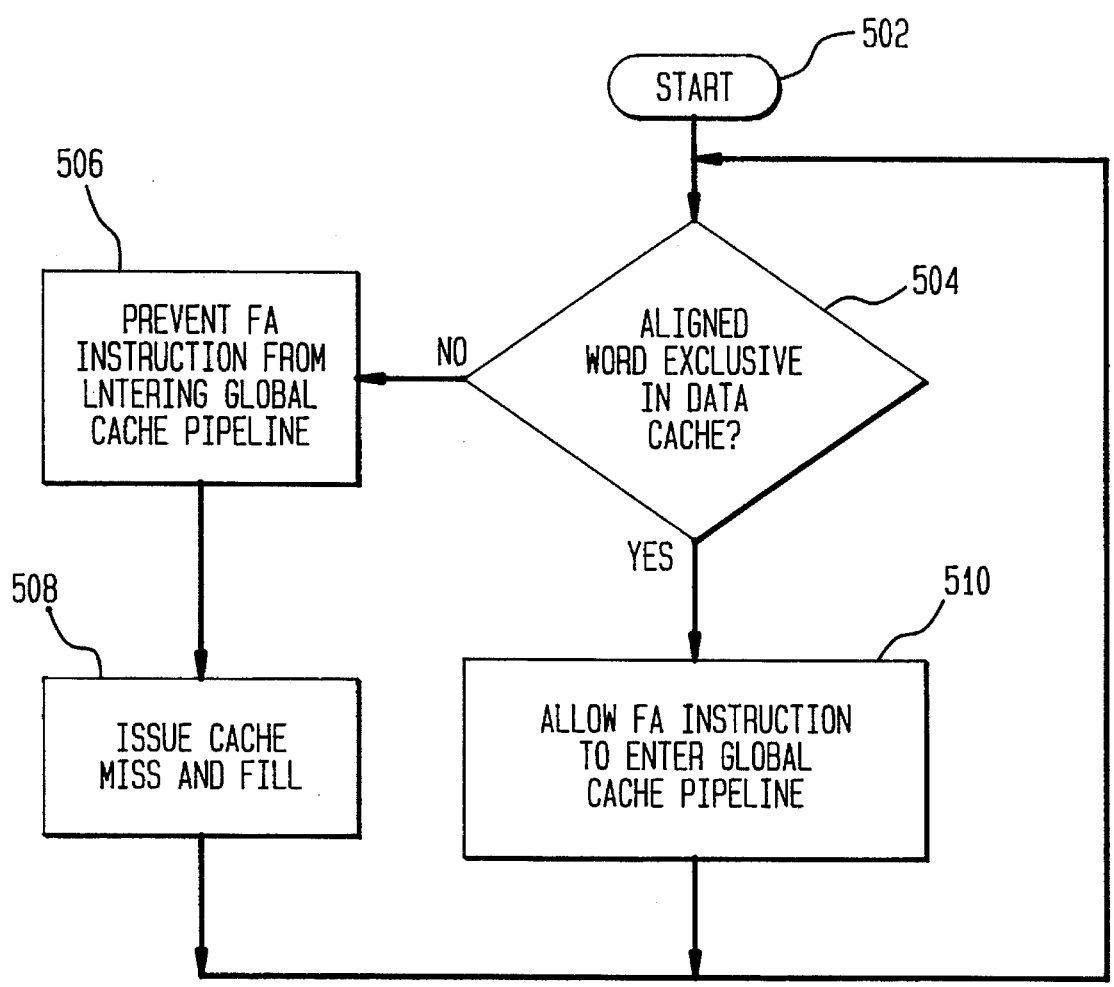

Rule (3) is preferably implemented by appending a W (writable) bit to each cache block (which is preferably 128 bytes wide) in the data cache 108. If a cache block is exclusive in the data cache 108, then the W bit associated with the cache block in the data cache 108 is preferably set to one; otherwise, it is set to zero. Further operation of the control system 150 shall now be described with reference to the flowchart shown in FIG. 5.

The control system 150 monitors integer store instructions being processed at the data cache 108 (that is, integer store instructions which are being processed in the pipeline of the data cache 108). If the aligned four-byte word associated with a FA instruction is in a cache block that is exclusive in the data cache 108 (as indicated by the W bit associated with the cache block; this test is represented by step 504), then the FA instruction is allowed to enter the pipeline of the global cache 112, subject to other processing of the control system 150, described herein (this is represented by step 510).

If the aligned four-byte word associated with the FA instruction is in a cache block that is not exclusive in the data cache 108 (this test is represented by step 504), then the FA instruction is not allowed to enter the pipeline of the global cache 112 (represented by step 506), and a cache miss and fill message is sent to the global cache 112 (represented by step 508).

The control system 150 is preferably implemented as a hardware state machine operating as discussed above, particularly in accordance with the four rules discussed above. Alternatively, the control system 150 is implemented as a processor operating in accordance with software.

The control system 150 is preferably implemented in each of the processing units (which have a split-level cache arrangement) as part of the integer functional unit (IU) which includes the data cache 108. Alternatively, the control system 150 is implemented in each of the processing units (which have a split-level cache arrangement) as a component external to the functional units 104. Alternatively, the control system 150 is implemented as multiple state machines which are distributed throughout each of the processing units of the computer system 101 which include a split-level cache arrangement.

The control system 150 is preferably developed using an appropriate compiler system which enables a hardware developer to develop and prototype hardware circuits in software. In such compiler systems, the functionality of hardware components can be represented using pseudocode. Such compiler systems can be used to verify logic, and can aid in defining the timing and generation of control signals and associated random logic. One such compiler is the Verilog compiler by Cadence Design Systems, Inc., of San Jose, Calif.

Further details pertaining to the implementation of the present invention will be apparent to persons skilled in the relevant art based on the discussion contained herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of preventing data loss in a computer system comprising a plurality of processing units each having at least one cache, wherein multi-processor cache coherency is maintained in the computer system, at least one of the processing units including a split-level cache arrangement comprising a first level cache coupled to a second level cache, wherein integer store instructions enable data to be stored in both the first level cache and the second level cache, the first level cache being byte writable and the second level cache being word writable, the method comprising the steps of:

(a) monitoring a pipeline of the second level cache to determine whether a forced atomic (FA) instruction is in the second level cache pipeline, a FA instruction being an integer store instruction which requires allocation in the first level cache and which enables data of length other than a word multiple to be stored in the first level cache, wherein during execution of a FA instruction one or more bytes are read from the first level cache and written to the second level cache along with write data of the FA instruction, such that data of word length is written to the second level cache; and (b) if a FA instruction is determined to be in the second level cache pipeline, then delaying interventions to the second level cache until the FA instruction exits the second level cache pipeline to thereby delay execution of cache memory access instructions responsible for generation of said interventions, such that data written by operation of said cache memory access instructions is not destroyed by operation of the FA instruction.

2. The method of claim 1, further comprising the steps of:

(c) determining whether an intervention to the second level cache is pending; and (d) if an intervention to the second level cache is pending, then preventing FA instructions from entering the second level cache pipeline, such that execution of interventions to the second level cache is not indefinitely delayed due to the presence of FA instructions in the second level cache pipeline.

3. The method of claim 1, wherein step (a) comprises the steps of:

associating with instructions entering the second level cache pipeline indicia identifying whether the instructions are FA instructions; and analyzing said indicia of instructions in the second level cache to determine whether a FA instruction is in the second level cache pipeline.

4. The method of claim 3, wherein said indicia comprises a forced atomic (FA) bit which is associated with each instruction entering the second level cache pipeline, the FA bit being set to a first value for FA instructions and being set to a second value for non-FA instructions.

5. The method of claim 1, wherein in step (b) interventions which access in the second level cache an aligned multi-byte word in which the write data of the FA instruction is contained are delayed until the FA instruction exits the second level cache pipeline.

6. A method of preventing deadlock among processing units in a computer system comprising a plurality of processing units each having at least one cache, wherein multi-processor cache coherency is maintained in the computer system, at least one of the processing units including a split-level cache arrangement comprising a first level cache coupled to a second level cache, the first level cache being byte writable and the second level cache being word writable, the method comprising the steps of:

(a) monitoring a pipeline of the second level cache to determine whether a possible miss (PM) instruction is in the second level cache pipeline, a PM instruction being a cache memory access instruction which requires allocation in the second level cache but which does not require allocation in the first level cache; and (b) if a PM instruction is determined to be in the second level cache pipeline, then preventing forced atomic (FA) instructions from entering the second level cache pipeline, a FA instruction being a cache memory access instruction which enables data to be stored in both the first level cache and the second level cache wherein data stored in the first level cache is of length other than a word multiple, wherein interventions to the second level cache are not permitted while a FA instruction is in the second level cache pipeline;

such that execution of interventions to the second level cache is not prevented while there is a potential for an instruction in the second level cache to be detained while an intervention is processed in its behalf, such that deadlock between processing units of the computer system is prevented.

7. The method of claim 6, wherein step (a) comprises the steps of:

associating with instructions entering the second level cache pipeline indicia identifying whether the instructions are PM instructions; and analyzing said indicia of instructions in the second level cache to determine whether a PM instruction is in the second level cache pipeline.

8. The method of claim 7, wherein said indicia comprises a potential miss (PM) bit which is associated with each instruction entering the second level cache pipeline, the PM bit being set to a first value for PM instructions and being set to a second value for non-PM instructions.

9. A method of controlling the execution of cache memory access instructions in a computer system comprising a plurality of processing units each having at least one cache, wherein multi-processor cache coherency is maintained in the computer system, at least one of the processing units including a split-level cache arrangement comprising a first level cache coupled to a second level cache, wherein integer store instructions enable data to be stored in both the first level cache and the second level cache, the first level cache being byte writable and the second level cache being word writable, the method comprising the steps of:

(a) monitoring a pipeline of the second level cache to determine whether a forced atomic (FA) instruction is in the second level cache pipeline, a FA instruction being an integer store instruction which requires allocation in the first level cache and which enables data of length other than a word multiple to be stored in the first level cache, wherein during execution of a FA instruction one or more bytes are read from the first level cache and written to the second level cache along with write data of the FA instruction, such that data of word length is written to the second level cache;

(b) monitoring the second level cache pipeline to determine whether a possible miss (PM) instruction is in the second level cache pipeline, a PM instruction being a cache memory access instruction which requires allocation in the second level cache but which does not require allocation in the first level cache;

(c) if a PM instruction is determined to be in the second level cache pipeline, then preventing FA instructions from entering the second level cache pipeline; and (d) if a FA instruction is determined to be in the second level cache pipeline, then delaying interventions to the second level cache until the FA instruction exits the second level cache pipeline.

10. The method of claim 9, further comprising the steps of:

(e) determining whether an intervention to the second level cache is pending; and (f) if an intervention to the second level cache is pending, then preventing FA instructions from entering the second level cache pipeline, such that execution of interventions to the second level cache is not indefinitely delayed due to the presence of FA instructions in the second level cache pipeline.

11. The method of claim 9, further comprising the steps of:

(e) determining whether an aligned multi-byte word in which the write data of an integer store operation is contained is exclusive in the first level cache; and (f) if it is determined that the aligned word is not exclusive in the first level cache, then preventing the integer store operation from entering the second level cache pipeline, and initiating a cache miss and fill operation to cause the aligned word to be exclusive in the first level cache.

12. A control system for controlling the execution of cache memory access instructions in a computer system comprising a plurality of processing units each having at least one cache, wherein multi-processor cache coherency is maintained in the computer system, at least one of the processing units including a split-level cache arrangement comprising a first level cache coupled to a second level cache, wherein integer store instructions enable data to be stored in both the first level cache and the second level cache, the first level cache being byte writable and the second level cache being word writable, the control system comprising:

means for monitoring a pipeline of the second level cache to determine whether a forced atomic (FA) instruction is in the second level cache pipeline, a FA instruction being an integer store instruction which requires allocation in the first level cache and which enables data of length other than a word multiple to be stored in the first level cache, wherein during execution of a FA instruction one or more bytes are read from the first level cache and written to the second level cache along with write data of the FA instruction, such that data of word length is written to the second level cache;

means for monitoring the second level cache pipeline to determine whether a possible miss (PM) instruction is in the second level cache pipeline, a PM instruction being a cache memory access instruction which requires allocation in the second level cache but which does not require allocation in the first level cache;

means for preventing FA instructions from entering the second level cache pipeline when a PM instruction is determined to be in the second level cache pipeline; and means for delaying interventions to the second level cache until the FA instruction exits the second level cache pipeline when a FA instruction is determined to be in the second level cache pipeline.

13. The control system of claim 12, further comprising:

means for determining whether an intervention to the second level cache is pending; and means for preventing FA instructions from entering the second level cache pipeline when it is determined that an intervention to the second level cache is pending, such that execution of interventions to the second level cache is not indefinitely delayed due to the presence of FA instructions in the second level cache pipeline.

14. The control system of claim 12, further comprising:

means for determining whether an aligned multi-byte word in which the write data of an integer store operation is contained is exclusive in the first level cache; and means for preventing the integer store operation from entering the second level cache pipeline, and initiating a cache miss and fill operation to cause the aligned word to be exclusive in the first level cache, when it is determined that the aligned word is not exclusive in the first level cache.

* * * * *